Aug. 18, 1931.                T. CROPPER                     1,819,232
         INSTRUMENT FOR DETERMINING THE QUALITY OF BALLS
              FOR GAMES AND COMPONENTS THEREFOR
                    Filed July 23, 1929            5 Sheets-Sheet 1
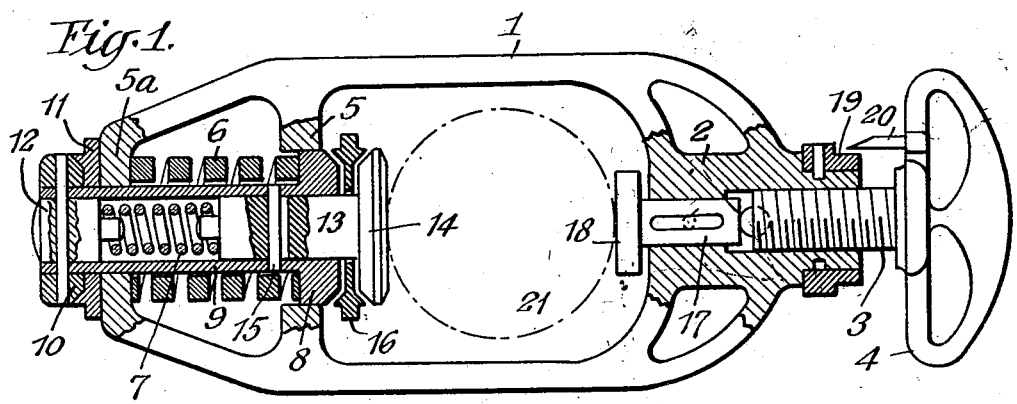
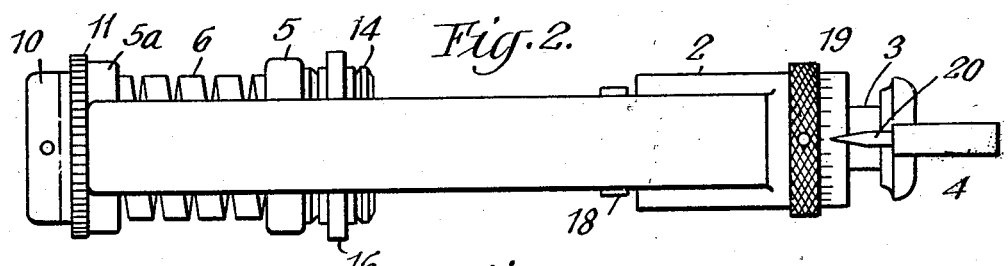
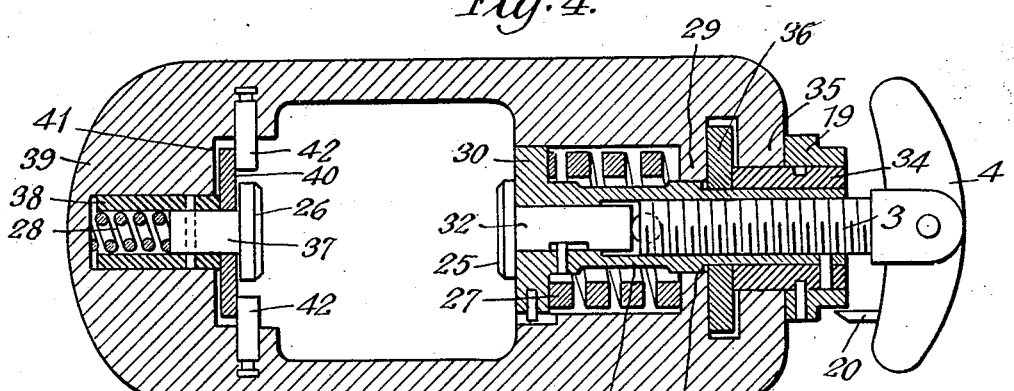
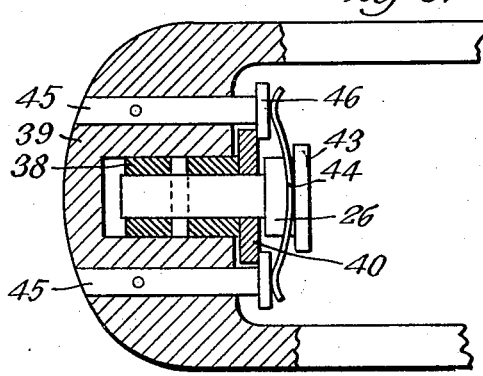
Inventor
THOMAS CROPPER
By his Attorneys Aug. 18, 1931. T. CROPPER 1,819,232
INSTRUMENT FOR DETERMINING THE QUALITY OF BALLS
FOR GAMES AND COMPONENTS THEREFOR
Filed July 23, 1929 5 Sheets-Sheet 2
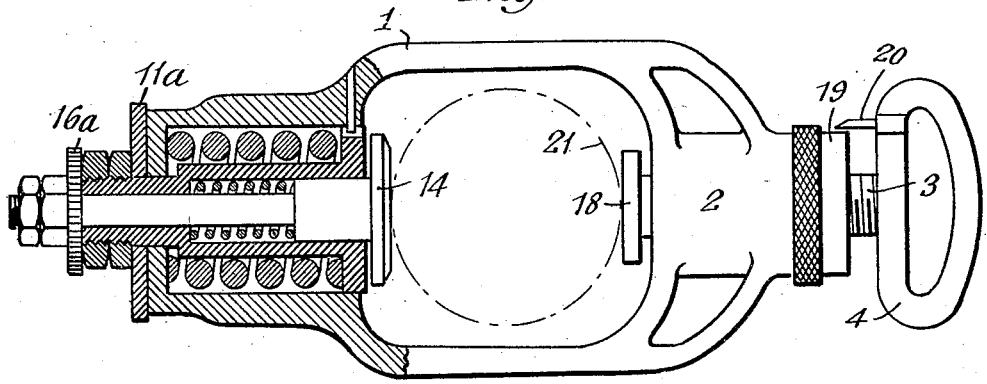
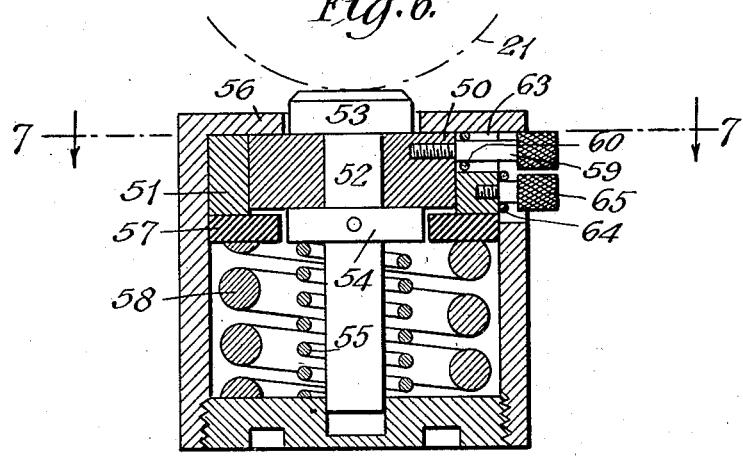
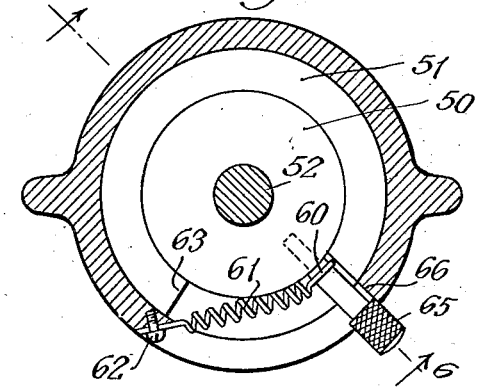
Inventor
THOMAS CROPPER
By his Attorneys
Usina & Rauber

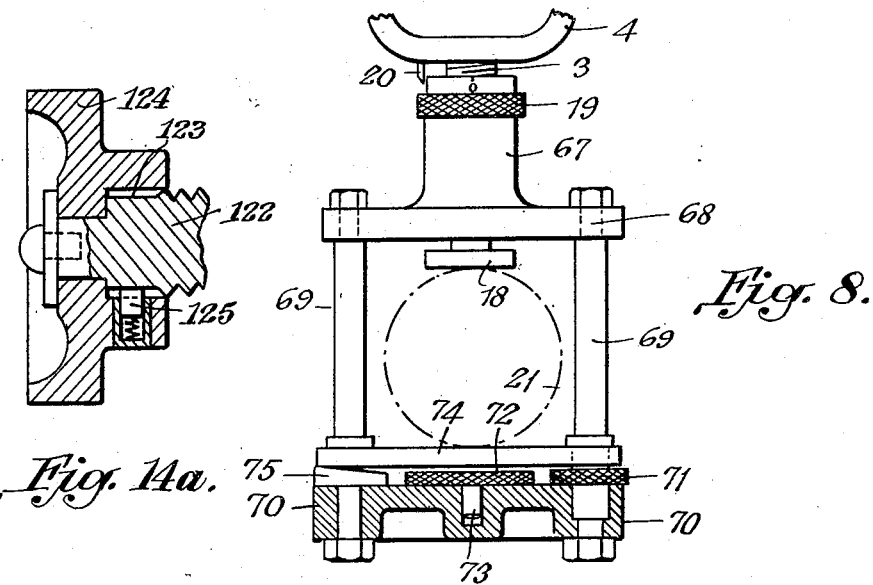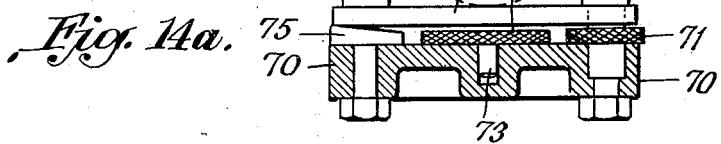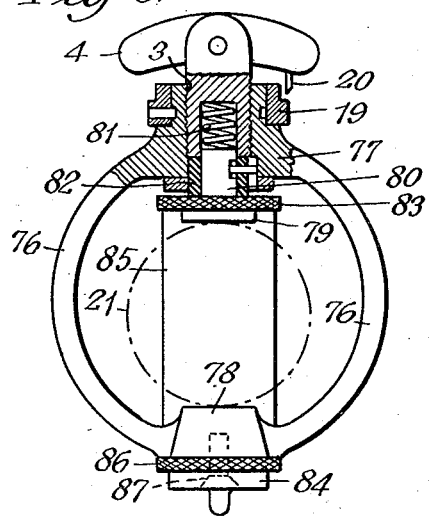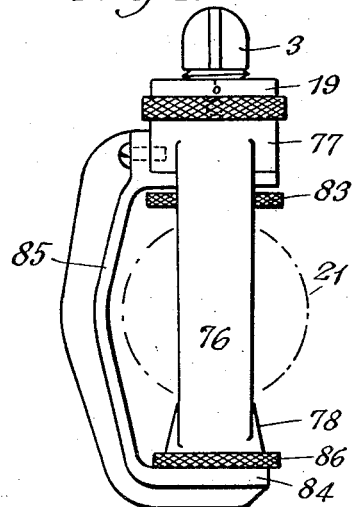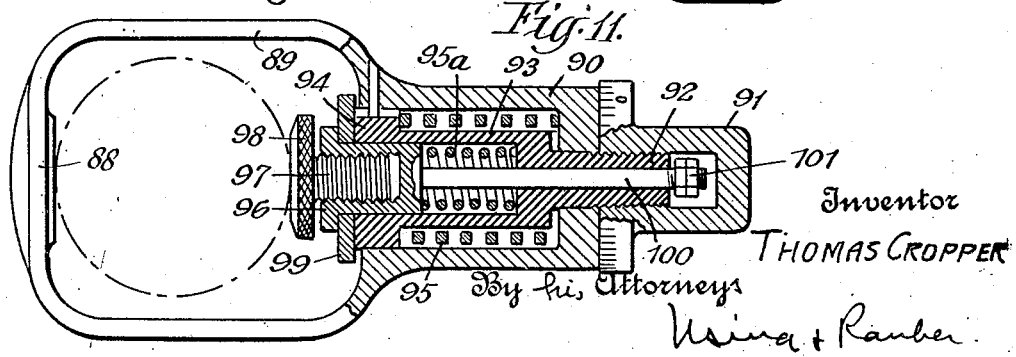

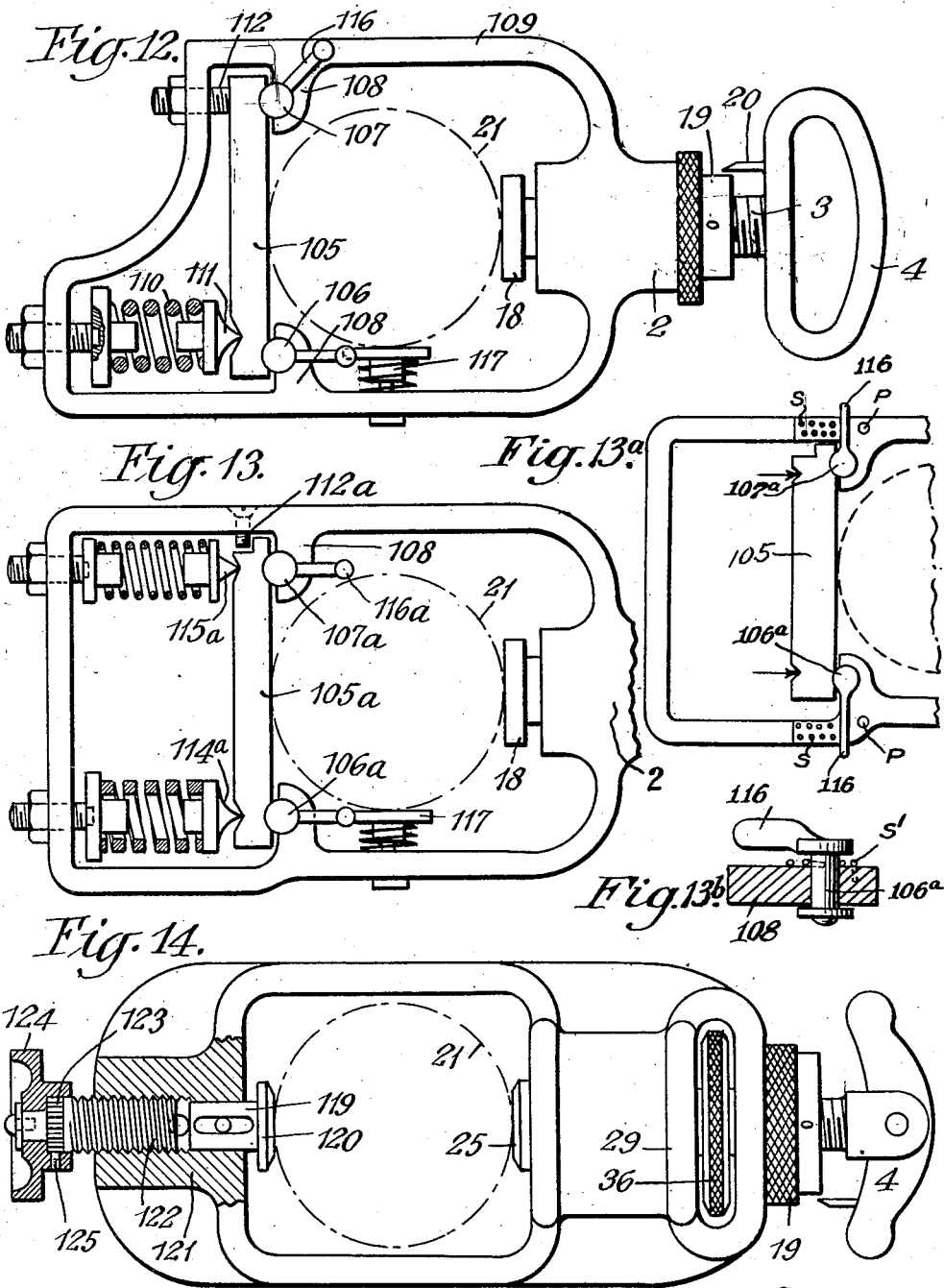

Aug. 18, 1931. T. CROPPER 1,819,232
INSTRUMENT FOR DETERMINING THE QUALITY OF BALLS
FOR GAMES AND COMPONENTS THEREFOR
Filed July 23, 1929 5 Sheets-Sheet 5
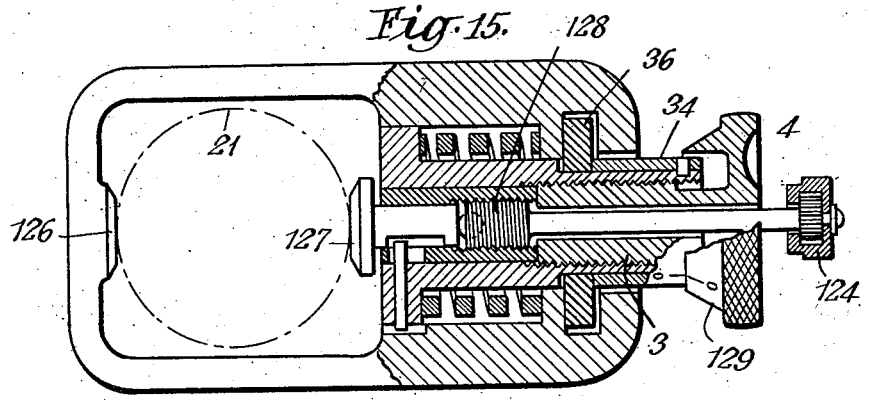
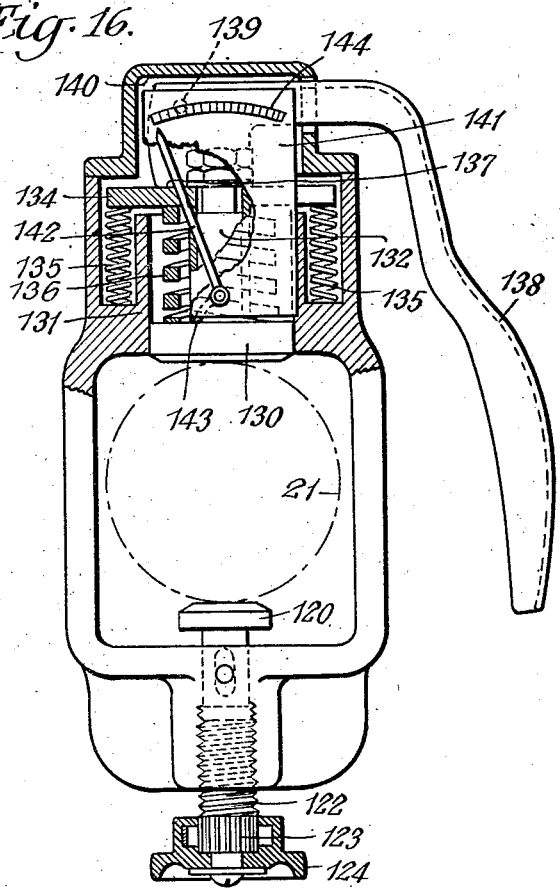
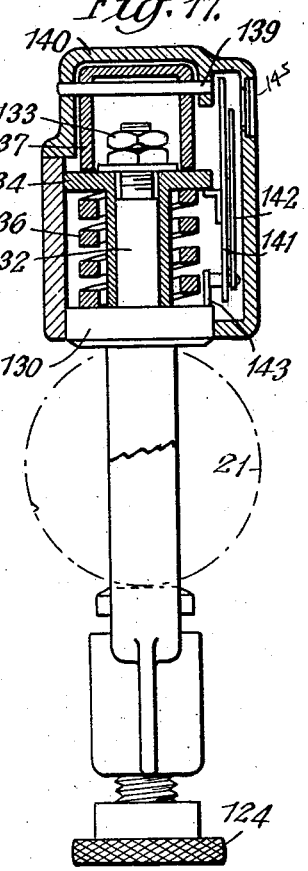
Inventor
THOMAS CROPPER
By his Attorneys Patented Aug. 18, 1931

1,819,232

UNITED STATES PATENT OFFICE

THOMAS CROPPER, OF ERDINGTON, ENGLAND

INSTRUMENT FOR DETERMINING THE QUALITY OF BALLS FOR GAMES AND COMPONENTS THEREFOR

Application filed July 23, 1929, Serial No. 380,438, and in Great Britain April 2, 1929.

This invention relates to instruments for determining and indicating the compressibility of balls for games and components thereof.

It is known that the quality and potentials of playing balls and playing ball components, such as golf balls, golf ball cores and tennis balls can be gauged by their compressibility and it is the practice in the trade to grade them on the basis of a test according to a particular formula.

The formula of the trade test comprises subjecting the objects to a given load in two stages and recording the compressibility during the second stage of the compression, the deformation occurring during the first stage being disregarded except that it is the stage from which the deformability test proper is commenced.

It may be to advantage to appreciate that the first imposition, or as previously described, the first stage of the load compared with the second stage is of very small magnitude and is not imposed so much for causing any perceptible deformation of the object under test, but more for the purpose of ensuring that the object is clamped by the anvils or rests with a determined pressure before the second imposition is imposed.

Instruments or gauges in accordance with this invention may be used to perform this particular test if desired.

The object of this invention is to provide a neat and simple instrument or gauge of such compass and design so that it can be used by the users of the playing balls, and so that if desired it may be carried on the person of the user, or in a pocket in the case in which the complementary devices (such as golf clubs or tennis rackets) are placed.

Another object is the provision of means to ensure accurate reading of the gauge and to record either if or when loads have been imposed, and incidentally when tests have been started or completed, or any other stage.

According to this invention, instruments for the purpose set forth are of such design and proportions to render them portable not only in the sense that they may be carried in a pocket of the user or in a receptacle of a golf club bag, tennis racket case, or other cover in which complementary members are carried, but that they may be operated at any angle without being affected detrimentally by the force of gravity; and comprise a frame giving support to a pair of anvils displaceably relative to one another capable of engaging and loading at diametrically opposite points, an object to be tested; resilient means to load at least one of said anvils; load applying means; means to indicate any displacement of either or both anvils and means to indicate extent of such movement if any in terms capable of being interpreted as an index of compressibility of the object undergoing the test; with or without means automatically to indicate the application of one or both stages of the load.

Various features of the invention are illustrated in the accompanying drawings, in which—

Fig. 1 is a longitudinal section of a gauge embodying a form of the invention.

Fig. 2 is a longitudinal side view of the gauge shown in Fig. 1.

Fig. 3 is a part sectional, longitudinal view of a modified form of gauge.

Fig. 4 is a longitudinal sectional view of still another modification.

Fig. 5 is a part sectional view of a modified part of the gauge.

Figs. 6 and 7 are longitudinal and cross sectional views of a part of a gauge embodying a still further modification.

Fig. 8 is a part sectional view of still another modification of the invention.

Figs. 9 and 10 are part sectional and side views of still another modification.

Fig. 11 is a part sectional longitudinal view of a still further modification.

Figs. 12 and 13 are side views of still further modifications.

Figs. 13a and 13b are detail views of portions of the gauges in Fig. 13.

Fig. 14 is a longitudinal view, partly in section, of another modification.

Fig. 14a is a detail view of the part of the gauge shown in Fig. 14.

Figs. 15, 16 and 17 are longitudinal views, partly in section, of still other modifications.

The example illustrated in Figures 1 and 2 comprises a substantially open frame having side webs 1 and a uniting member or boss at each end, one boss 2 receiving a threaded spindle or gauge screw 3 equipped with a milled or other suitable head 4. The other boss comprises a pair of webs or bridge pieces 5 and 5ª which accommodate two coiled compression springs 6 and 7 disposed concentrically one within the other, 6 being stronger than 7 and engages a thrust ring or platform 8 positioned by the part 5 and the part 5ª, which houses a sleeve 9 with a fixed collar 10 upon its exterior. Between the collar 10 and the part 5ª and mounted freely upon the sleeve 9 is an indicator ring 11 to which further reference is made hereinafter.

Housed within the sleeve 9 and acting against a plug 12 and the stem 13 of an anvil or rest 14 is the spring 7. The stem 13 is locked within the sleeve 9 by a key 15 and is capable of a slight axial movement therein.

Loosely mounted upon the stem 13 and located between the platform 8 and the anvil 14 is another indicator ring 16.

Preferably non-rotatable in the boss 2 is the stem 17 of a further anvil or rest 18 which constitutes a linear extension of the previously described screw 3, and upon the outer end of the boss 2 and normally inseparable therefrom is a freely rotatable graduated ring 19 mounted adjacent the screw head 4 upon which is a pointer 20.

Movement of the anvil 14 is indicated by the previously mentioned indicator rings 11 and 16.

To perform a test, the object to be tested represented by dotted lines 21 is placed in position in the frame and the member 3 rotated till the object is engaged by the anvils 14 and 18 and until the former has been displaced against the action of the spring 7 sufficiently to thrust the ring 16 against the platform 8 to prevent the ring 16 from being rotated by light manual effort. When this has occurred the first imposition has been made and the zero position of the test is attained, and to indicate this the graduated ring 19 is rotated until its zero marking coincides with the pointer 20. To proceed with the test the screw 3 is then further rotated until the indicator ring 11 which has previously been held against rotation by the force of the spring 6 becomes loose. The amount of movement of the screw 3 from the zero position required to release the ring 11 may now be ascertained from the graduated ring 19 and it is this information that constitutes the data of the test.

In Figure 3 it will be seen that the indicator rings 11ª and 16ª may be disposed in different positions and arranged to operate in alternative ways, for instance as shown in this construction normally they are locked but are freed for movement only upon the application of the loads.

In order that the indicator rings may be responsive to the slightest movement of the member 3 and so ensure an accurate reading they may have conical faces to engage complementary bevelled faces on neighbouring parts to increase the friction between them. Examples of them are illustrated in Figures 1 and 2. This may also be obtained however, by providing means to co-operate with normally locked indicator rings to free them for rotation only upon the application of given loads, and to again lock the indicator rings against movement upon excessive loads being applied or incidentally upon excessive movement of the screwed member 3.

A construction of this character is illustrated in Figures 4 and 5, where the anvils or rests 25 and 26 are resiliently loaded by the springs 27 and 28 respectively, the spring 27 bearing against the part 29 of the frame and the collar 30 on the sleeve 31 which is recessed internally and gives support both to the stem 32 of the anvil 25, and the threaded member 3.

The sleeve 31 is flanged at 33 and has fixed to it a collar 34 which gives bearing to the graduated ring 19 of the kind previously described.

Loosely mounted upon the sleeve 31 between the flange 33 and the collar 34, incidentally also between the parts 29 and 35 of the frame, is an indicator ring 36, with this arrangement only a limited movement can be given to the member 3 to release the indicator ring 36 for should the operator inadvertently or otherwise move the member 3 too much the indicator ring 36 (which normally is held by the sleeve 34 against the part 29 of the frame) is engaged by the flange 33 and is thrust against the part 35.

This arrangement is also reproduced for the anvil 26 the stem 37 of which is held rigidly in the sleeve 38 displaceably housed in the boss 39 and gives support to the spring 28. An indicator ring 40 is loosely mounted upon the stem 37 and located between the face 41 of the frame, and the stops 42 adjustable within the frame.

In performing a test, at both phases of the load, only sufficient movement of the member 3 is given to release the indicator rings 36 and 40.

Leaf springs may be used instead of coil springs and as shown at Figure 5, which is a detail end view of a similar construction to Figure 4, the flange 43 of the anvil 26 is engaged by a leaf spring 44 which is supported upon parts 45 having enlarged heads 46 to engage the indicator ring 40.

According to another feature of this invention, to ensure that the indicator rings are responsive to a minimum movement of the member 3 they may be acted upon by springs so that at determined periods they may be moved automatically. An example of this is shown in Figures 6 and 7 wherein the indicator rings 50 and 51, the former being correlated with the first load and contained within the latter which with the former is arranged concentrically about the stem 52 of the anvil or rest 53, and a collar 54 taking the thrust of the spring 55 and forcing the ring 50 against the frame at 56, is secured to the stem 52.

The ring 51 is of greater thickness than the ring 50 and is forced against the part 56 by the platform or ring 57 loaded by the spring 58.

Anchored to a stud or lever 59 secured to the ring 50 is one end 60 of a spring 61 which is secured at 62 to the frame. The ring 51 is recessed at 63 for the reception of the spring and stud, and is similarly sprung by a spring 64 secured to the stud 65 with which it is furnished.

In performing a test with the embodiments illustrated in Figures 6 and 7 (which are purely diagrammatical views—the former being a sectional elevation on lines 6—6 of the latter—for obviously the springs may be arranged to operate in any other suitable way, under compression for instance), the object to be tested represented by dotted lines 21 is placed between the anvils—only one 53 of which is shown, the other being of similar construction and engaged by a screwed member as previously or hereinafter described, there also being provided a graduated ring such as designated 19—the rings 50 and 51 are rotated in an anti-clockwise direction by manually engaging the studs 59 and 65 and forcing them against the abutment 66 of the frame. Movement of the ring 51 is facilitated by first rotating the member 3 to remove at least the pressure of the spring 58 from the ring 51, then rotating the member 3 to allow the pressure to be applied.

The instrument now is in its operable condition and movement of the screwed member 3 to compress the object 21 under test first displaces the collar 57 and forces the ring 50 which is now rotated by the influence of the spring 61.

Indication of the application of the first load is hereby made and the graduated ring 19 is then moved to have the desired reading with the pointer 20. Upon the necessary further rotation of the member 3, which may now be made, to engage the ring 50 within the platform 57 to remove the pressure of the spring 58 from the ring 51, the ring 51 is then rotated by the influence of the spring 64 and afterwards no further rotation of the member 3 is effected.

In another embodiment, according to Figure 8, the one anvil 18 engaged by a threaded member 3 with the head 4 and pointer 20 is contained in a boss 67 having an integral bridge 68 which supports a pair or more rods 69 (formed integral or not therewith) which secure a web part 70 which gives bearing to freely rotatable indicator rings 71 and 72. The ring 71 is rotatable about one of the rods 69 and the ring 72 about a spigot 73 located in the web 70.

The complementary anvil in this instance is a flexible beam 74 positioned by the rods 69 and upon a washer 75.

The application of the first load in performing a test with an instrument of this construction is denoted by the indicator ring 71 and the second load by the ring 72. The rings are normally freely rotatable and are clamped successively as the beam 74 flexes under loading by the member 3.

According to another embodiment, parts or the whole of the frame may be of spring formation and thus dispense with one or more of the previously mentioned springs. An example of this character is represented in Figures 9 and 10 wherein the arms 76 connecting the bosses 77 and 78, in the former of which is housed an anvil 79 with a stem 80 engaged by a spring 81 and surrounded by a sleeve 82 which is acted upon by a screwed member 3 (hollowed for the reception of the spring 81) with a manipulating head 4 and pointer 20, are flexible. A graduated ring 19 is provided rotatable upon and normally undetachable from the boss 77 and an indicator ring 83 is mounted upon the stem 80.

The boss 78 constitutes one of the anvils and has below it a rigid limb or support 84 maintained immovable in respect to the boss 77 and formed upon the arm 85 united to the aforementioned boss 77.

An indicator ring 86 is disposed between the boss 78 and the arm 84 and is rotatable upon and retained by a screw 87.

The performance of this construction will be apparent from the drawings and it will be seen that after the first load is applied, which is denoted when the sleeve 82 engages and arrests the indicator ring 83 against rotation, the second load displaces the boss 78 until the ring 86 is held.

In the drawings the part 85 is shown made separate from the boss 77, but it may be constructed integral therewith if desired.

In the embodiment illustrated in Figure 11 one of the anvils designated 88 is formed integral with the frame upon a part which constitutes a bridge which unites one end of the side webs 89 which spring from the axially recessed boss 90 which is closed at its outer end and gives bearing to the internally threaded graduated flanged nut member 91 screwed upon the reduced threaded extension 92 of an axially recessed sleeve 93 flanged at 94 and housed within the recessed boss 90, and capable of limited axial movement therein.

Engaging the closed end of the boss 90 and the part 94 and surrounding the sleeve 93 is a spring 95 which operates to apply the second phase of the load.

The first phase is applied by a spring $95^a$ housed within the recessed sleeve 93 and engaging the flanged internally threaded plug member 96 which receives the threaded stem 97 of the anvil 98.

An indicator ring 99 is loosely mounted upon the part 96, disposed between the flange thereof and the flange 94, and an extension 100 axially displaceable in the extension 92 engaged by nuts 101 retains the part 96 in the sleeve member 93.

In this construction only one indicator ring is employed and in operating the nut 91 is rotated to draw the sleeve 93 as far as possible into the boss, and a reading is taken from the graduations on the flanged nut and the graduations upon the outside of the boss—a graduated ring such as designated 19 in the other described constructions may be employed, or the graduations may be upon the surface of the boss—the object placed in position and the anvil 98 rotated until the indicator ring 99 is held against movement by the flange of the member 96 and the flange 94.

The nut 91 is then first slackened until it rotates freely and then tightened to a light finger tightness. The reading now appearing denotes the data of the test.

In another embodiment described with reference to Figures 12 and 13 in the drawings, one of the anvils or rests is secured to or formed integral with a beam mounted upon one or more displaceable fulcrums, the movement of the beam being denoted by one or more members held frictionally against movement by pressure from the beam. The other anvil however, is contained within a boss and engaged by means substantially as described with reference to Figures 1 to 3.

Referring to Figure 12 the complementary anvil or rest comprises a beam 105 which is forced against circular indicator member 106 and 107 freely mounted in the abutments 108 extending from the side webs 109 which are united to the boss 2 by the pressure of the spring 110 upon the fulcrum 111 which is offset from the member 106.

At the test the first stage of the load is applied when the beam 105 engages an adjustable stop 112 and the indicator member 107 can be freely rotated, and the second stage of the load is applied when the member 106 likewise can be rotated. The movement of the beam relative to the moving member 3 can be ascertained as described previously by the aid of the pointer 20 and the graduated ring 19.

Alternatively, more than one resiliently loaded fulcrum may be employed to load the beam $105^a$, see for instance Figure 13, where spring loaded fulcrums $114^a$ and $115^a$ force the beam $105^a$ against the indicator members $106^a$ and $107^a$ respectively, the fulcrums being disposed preferably substantially in alignment with the members $106^a$ and $107^a$.

As in the construction according to Figure 12, the first stage of the load is applied when the beam engages the stop $112^a$ and the indicator member $107^a$ is freely rotatable.

As shown in Figures 12 and 13, the indicator members $106^a$ and $107^a$ have projections 116 which may be of sufficient weight to rotate them without manual effort, or springs may be provided for this purpose. The arrangement of such springs is illustrated in Figs. $13a$ and $13b$. In $13a$ the springs S are of the ordinary compression type adapted to throw the part 116 against the pin or stop P when the pressure of the beam 105 has been removed from the spindles $106a$ or $107a$.

In the form of the invention shown in Fig. $13b$ the spindle $106a$ or $107a$ is recessed to receive the end of a volute spring $S'$ whose other end is anchored in the part 108 of the frame. The spring $S'$ operates the throw arm 116 in substantially the same manner as the spring S in the form shown in Fig. $13a$.

In Figures 12 and 13 there also is provided a resiliently loaded nut 117 to assist positioning the object to be tested.

At Figures 14 to 17 other embodiments are shown but particularly means for applying the first stage of the load independently of the other stage applying means, so that an indicator ring is not necessary to denote the first stage at least as the first load applying means cannot apply other than a given load.

Means of this character are illustrated in Figures 14 to 17, but are described more particularly with reference to Figure 14 wherein the stem 119 of the anvil 120 is maintained normally inseparable from, nonrotatable and axially displaceable in the boss 121 and is engaged by the rotatable threaded plunger 122 having ratchet teeth or other serrations 123 at one end.

Within a recess in or otherwise secured to a rotatable nut 124 maintained normally inseparable from the plunger 122 is a spring loaded stud or tooth 125 best shown in Fig. $14a$, which has engagement with the serrations 123 in such a manner that positive engagement between the serrations 123 and the tooth 125 occurs only in one direction of rotation of the nut 124, but in the reverse direction the engagement is effected and maintained frictionally.

The frictioned drive is brought into operation when it is desired to force the anvil against the object, so that only a determined load can be applied.

The second stage of the load is applied by an anvil housed and engaged by means similar to that described in Figure 4, a ring 19 being provided if desired, but not necessarily.

Alternatively, and as shown in Figure 15, one of the anvils 126 may be made integral with the frame and the only displaceable anvil 127 engaged by a frictionally driven rotatable plunger 128. Otherwise it will be seen that the greater load applying means are similar to that described with reference to Figure 4, except that a ring 19 is not employed and that the pointer is replaced by a graduated part that is complementary to graduations upon the exterior of the sleeve 34.

To perform a test with either of the constructions according to Figures 14 and 15 the frictionally engaged nut 124 is rotated until the threaded plunger ceases to move when it will be found that a definite load has been imposed upon the object. The other load is applied in the manner previously described by the rotation of the member 3.

According to another feature of this invention other than loosely mounted rings may be provided to denote the performance of the gauge for example, there may be provided one or more pivotally mounted fingers or pointers co-operating with suitable dials secured to any part of the gauge. This feature of the invention is introduced by way of example in Figures 16 and 17 in which incidentally the first stage of the load is applied by a frictionally moved anvil 120 of the construction described in Figures 14 and 15.

The anvil 130 for applying the greater load is housed within the boss 131 and has a stem 132 upon which is located and secured by the nuts 133 a cross beam 134 which is supported by springs 135 housed in recesses in the boss.

A spring 136 tends normally to separate the anvil 130 from the beam 134 which is engaged at its upper surface by the cam surfaces 137 of the lever 138 fulcrumed on the spindle 139 secured to the casing 140.

Secured to the beam 134 is a dial 141 to which is pivotally mounted a pointer 142. A limb 143 connected to the pointer engages the upper surface of the anvil 130.

To make a test with the instrument the object 21 is placed between the anvil and the nut 124 rotated until the anvil 120 ceases to move.

The lever 138 is then pulled tightly against the frame and any relative movement between the anvil 130 and the beam 134 is reproduced by the pointer 142 which has a path along the dial markings 144.

A spring (not shown) is provided to hold the pointer in one direction and an observation aperture 145 encloses with transparent material may be provided, if desired.

Of course, it will be understood that the illustrations of Figures 16 and 17 are diagrammatical and show the provision of a dial and pointer to reproduce relative movement between the beam 134 and the anvil 130 and that any constructional details may be employed, to exemplify the dial or the pointer may be secured to any other part and means may be provided, if necessary, to increase the movement of the finger relative to the movement between the beam and the anvil.

Instruments or gauges constructed in accordance with this invention have the unquestionable advantage of being extremely simple in construction so that they can be operated without much manual effort and by the absence of loose parts, and by utilizing anchored springs for applying the loads the instruments are portable not only in the sense that they may be carried in a pocket either on the person or the user or of a golf bag, tennis racket case or other cover, without inconvenience, but that they may be used in any position and are not influenced to any discernable degree by gravity.

While I have described quite specifically the various details of the embodiments of the invention illustrated it is not to be construed that I am limited thereto since various modifications may be made by those skilled in the art without departing from the invention as defined in the appended claims.

1. An instrument for testing game balls comprising means for applying progressive loads thereto in two separate stages, means for determining when each load has attained a predetermined magnitude and means for determining the extent of deformation of the ball under a given load.

2. An instrument for testing the resilient qualities of game balls comprising separate means tending to compress the ball under different and progressive loads, means for determining when each load has attained a predetermined magnitude, and means for measuring the deformation of the ball under at least one of said loads.

3. An instrument for testing the resilient qualities of game balls comprising, ball engaging means, loading means to resiliently load said ball engaging means with two loads of different magnitude, manually actuated means for successively bringing said loading means into play and means for indicating the extent of movement of one of said loading means.

4. An instrument for testing game balls comprising a pair of anvils for engagement with the balls at different points, respective springs re-acting against said anvils, means for pressing one anvil toward the other so as to bring said springs successively into play, means for determining when each spring is brought into play and means for determining the deformation of the ball under influence of one of said springs.

5. An instrument for testing the resilient qualities of game balls comprising a pair of anvils for engagement with the ball, springs of different strength tending to compress the ball between said anvils, manually actuated means for pressing one anvil toward the other, respective means for indicating when the load of each spring is applied, and means for determining the extent of deformation of the ball by the stronger spring.

6. An instrument adapted to permit a player to determine the resilient qualities of a game ball in the field, comprising a frame, a pair of anvils adapted to support the ball to be tested, springs of different strengths arranged to re-act against the ball held between said anvils, manually actuated means for bringing said springs into play successively, and means for indicating the amount of deformation of the ball by one of said springs.

7. An instrument adapted to permit a player to determine the resilient qualities of a game ball in the field, comprising a supporting frame, a pair of ball engaging anvils carried thereby, means for applying loads of different and progressive magnitudes to the ball, manually actuated means for successively bringing said loading means into play, means for determining when each loading means attains a predetermined magnitude, and means for indicating the extent of deformation of the ball.

8. A gauge of the character described comprising a frame, a ball engaging anvil carried thereby, manually actuated means tending to force said anvil against the ball, a second anvil, a sleeved member slidable in the frame and slidably supporting said second anvil, springs of different strengths reacting against said second anvil, an indicating member adapted to frictionally engage said second anvil and said sleeved member, a collar secured to the sleeved member and a second indicating member adapted to frictionally engage said collar and a portion of the frame.

9. An instrument for testing game balls comprising means for applying progressive loads thereto in two separate stages, means released by said load applying means when the latter attain predetermined magnitudes, and means for determining the extent of deformation of the ball under a predetermined load.

10. An instrument for testing game balls comprising means for applying progressive loads thereto in two stages, means for automatically determining when said applied load attains a predetermined magnitude, and means for determining the extent of deformation of the ball under a load of said magnitude.

11. An instrument for testing the resilient qualities of game balls which comprises separate means for compressing the ball under different progressive loads, means for automatically determining when each load has attained a predetermined magnitude, and means for measuring the deformation of the ball under a load of predetermined magnitude.

12. Portable instrument for the purpose set forth operating independent of gravity comprising a pair of anvils relatively displaceable to one another and capable of engaging and loading at diametrically opposite points an object to be tested, a frame for said anvils, resilient means to load at least one of said anvils, load applying means, means to indicate any displacement of either or both anvils, and means to indicate extent of such displacement in terms capable of being interpreted as an index of compressibility of the object undergoing the test, substantially as described.

13. Instrument as claimed in claim 12 wherein the compressibility is determined on the basis of the deformation of the object under the second stage of a load applied in two stages by loading means having associated with them means to indicate when one or both stages have been applied, and means to indicate the extent of movement of the load applying means respectively, the latter being in terms capable of being interpreted as an index of compressibility, substantially as described.

14. Instrument as claimed in claim 12 characterized by the fact that loading is effected by one or more springs.

15. Instruments as claimed in claim 12 characterized in that indication is given automatically of the application of one or both stages of the load.

In witness whereof, I have hereunto signed my name.

THOMAS CROPPER.